(12) United States Patent
Ikeda et al.

(10) Patent No.: US 10,585,820 B2
(45) Date of Patent: Mar. 10, 2020

(54) MEMORY CONTROLLER, MEMORY CONTROL METHOD AND SEMICONDUCTOR STORAGE APPARATUS

(71) Applicant: Hitachi, Ltd., Chiyoda-ku, Tokyo (JP)

(72) Inventors: Yasuhiro Ikeda, Toyko (JP); Yutaka Uematsu, Tokyo (JP); Masatsugu Oshimi, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 15/740,543

(22) PCT Filed: Sep. 18, 2015

(86) PCT No.: PCT/JP2015/076775
§ 371 (c)(1),
(2) Date: Dec. 28, 2017

(87) PCT Pub. No.: WO2017/046958
PCT Pub. Date: Mar. 23, 2017

(65) Prior Publication Data
US 2018/0196766 A1    Jul. 12, 2018

(51) Int. Cl.
*G06F 13/00* (2006.01)
*G06F 13/16* (2006.01)

(52) U.S. Cl.
CPC ...... *G06F 13/1684* (2013.01); *G06F 13/1605* (2013.01); *G06F 13/1694* (2013.01)

(58) Field of Classification Search
CPC .. G06F 13/00; G06F 13/1684; G06F 13/1694; G06F 13/1605

(Continued)

(56) References Cited

U.S. PATENT DOCUMENTS 5,530,673 A     6/1996  Tobita et al.
5,860,080 A *   1/1999  James ................. G06F 12/0669
                                                            370/390

(Continued)

FOREIGN PATENT DOCUMENTS

JP      7-28690 A     1/1995
JP      9-219716 A    8/1997

(Continued)

OTHER PUBLICATIONS

International Search Report (PCT/ISA/210) issued in PCT Application No. PCT/JP2015/076775 dated Nov. 17, 2015 with English translation (four pages).

(Continued)

*Primary Examiner* — Tim T Vo
*Assistant Examiner* — Kim T Huynh
(74) *Attorney, Agent, or Firm* — Crowell & Moring LLP (57) ABSTRACT

In a memory controller, command, address and data are allocated to transmit the command, the address and the data to each of the plurality of memory devices through the same bus signal line and an identification signal to identify the command, the address and the data on the bus signal line is allocated to a memory common signal line in common among the plurality of memory devices to transmit the identification signal. When the memory controller indicates the data through the identification signal so as to make a first memory device transfer the data through the bus signal line, the memory controller makes the data transfer by the first memory device suspended, indicates the command through the identification signal so as to issue the command to a second memory device, and indicates the address through the identification signal so as to issue the address to the second memory device.

10 Claims, 9 Drawing Sheets

(58) Field of Classification Search
USPC .................. 710/14, 305–306, 100, 309–310
See application file for complete search history.

(56) References Cited

U.S. PATENT DOCUMENTS

| | | | |
|---|---|---|---|
| 7,370,141 B2* | 5/2008 | Takemae | G06F 13/1694 |
| | | | 711/108 |
| 8,489,780 B2* | 7/2013 | Sundaram | G11C 16/30 |
| | | | 710/14 |
| 2007/0133247 A1 | 6/2007 | Lee et al. | |
| 2010/0318730 A1 | 12/2010 | Mao et al. | |
| 2011/0010511 A1 | 1/2011 | Kinoshita | |
| 2012/0311371 A1 | 12/2012 | Shaeffer | |

FOREIGN PATENT DOCUMENTS

| | | |
|---|---|---|
| JP | 2003-131940 A | 5/2003 |
| JP | 2007-164787 A | 6/2007 |
| JP | 2011-18222 A | 1/2011 |
| JP | 2011-513845 A | 4/2011 |
| JP | 2012-226491 A | 11/2012 |
| JP | 2013-520721 A | 6/2013 |
| WO | WO 97/23833 A1 | 7/1997 |

OTHER PUBLICATIONS

Japanese-language Written Opinion (PCT/ISA/237) issued in PCT Application No. PCT/JP2015/076775 dated Nov. 17, 2015 (three pages).

\* cited by examiner

MEMORY CONTROLLER, MEMORY CONTROL METHOD AND SEMICONDUCTOR STORAGE APPARATUS

TECHNICAL FIELD

The present invention relates to a signal transmission technique by which a signal is transmitted among the semiconductor devices.

BACKGROUND ART

In recent years, there is a tendency that the storage products employing a flash memory prevails over the market, in accordance with which there is higher demand on the larger capacity and higher performance of such products. In order to enlarge the capacity of such products, it is important to improve on the packaging density of such various devices as chips, LSIs, ASICs and CPUs on the substrate.

For instance, if a memory controller can be made smaller in size, it allows the packaging density of the devices on the substrate to be enhanced. Such a silicon chip as a memory controller is sealed in a package of a predetermined size. In order to make the memory controller smaller in size, it is effective to reduce the number of its signal lines, because the physical size of such a package depends on the number of pins.

In Patent Literature 1, a technique to secure the memory bandwidth as required while restraining the number of signal lines and pins on the chips and the like from increasing is disclosed. At the abstract of Patent Literature 1, there is disclosure saying 'as regards a plurality of memories, a data bus is connected to the respective memories independently from one another. Further, as regards a plurality of memories, a selection signal line is connected to the respective memories independently from one another. A command signal line is connected to the plurality of memories with the same shared among them. A control unit, when an access request for at least two memories among the plurality of memories is outputted from a bus master, performs command control such that the overlapped command corresponding to such access request is not issued at the command signal line'. This technique permits the number of signal lines and pins on chips to reduce and the devices to be made smaller in size and the high density packaging of the storage products to be realized.

CITATION LIST

Patent Literature

Patent Literature 1: Japanese Patent Unexamined Application Publication No. 2012-226491

SUMMARY OF INVENTION

Technical Problem

However, the technique disclosed in Patent Literature 1 is not applicable to an interface (hereinafter, referred to as 'multiplex interface') to transmit the address/command signal and data signal of the semiconductor memory elements through a signal line in common among such elements. This is because as regards the 'multiplex interface', the data signal, address signal and command signal are transmitted through the same signal line, so that it is incapable of adopting such arrangement as a data bus and a selection signal line being provided to the respective plural memories independently from one another and a command signal line being provided to the plural memories in common among them.

The present invention is to provide a technique to restrain the performance of the memory controller employing 'multiplex interface' from deterioration in the meantime to permit the number of signal lines to reduce.

Solution to Problem

The memory controller according to one embodiment of the present invention is intended for controlling a plurality of memory devices. In the memory controller, command, address and data are allocated to transmit the command, the address and the data to each of the plural memory devices through the same bus signal line and an identification signal to identify the command, the address and the data on the bus signal line is allocated to a memory common signal line in common among the plurality of memory devices to transmit the identification signal. When the memory controller indicates the data through the identification signal so as to make a first memory device transfer the data through the bus signal line, the memory controller makes the data transfer by the first memory device suspended, indicates the command through the identification signal so as to issue the command to a second memory device, and indicates the address through the identification signal so as to issue the address to the second memory device.

Advantageous Effects of Invention

According to the present invention, in such signal transmission arrangement that the command, the address and the data are transmitted through the same bus signal line, it permits the number of signal lines to be reduced by allocating the identification signal on the bus signal line to the memory common signal line in common among a plurality of memory devices such that such identification signal is transmitted to the plurality of memory devices through such common signal line and restrains the performance of the data transfer from deterioration by suspending any one of the memory devices to transfer data even when such one of the memory devices is on the data transfer so as to issue the command and address to another memory device.

DESCRIPTION OF EMBODIMENTS

To begin with, an embodiment is explained as follows.

Figure 1:
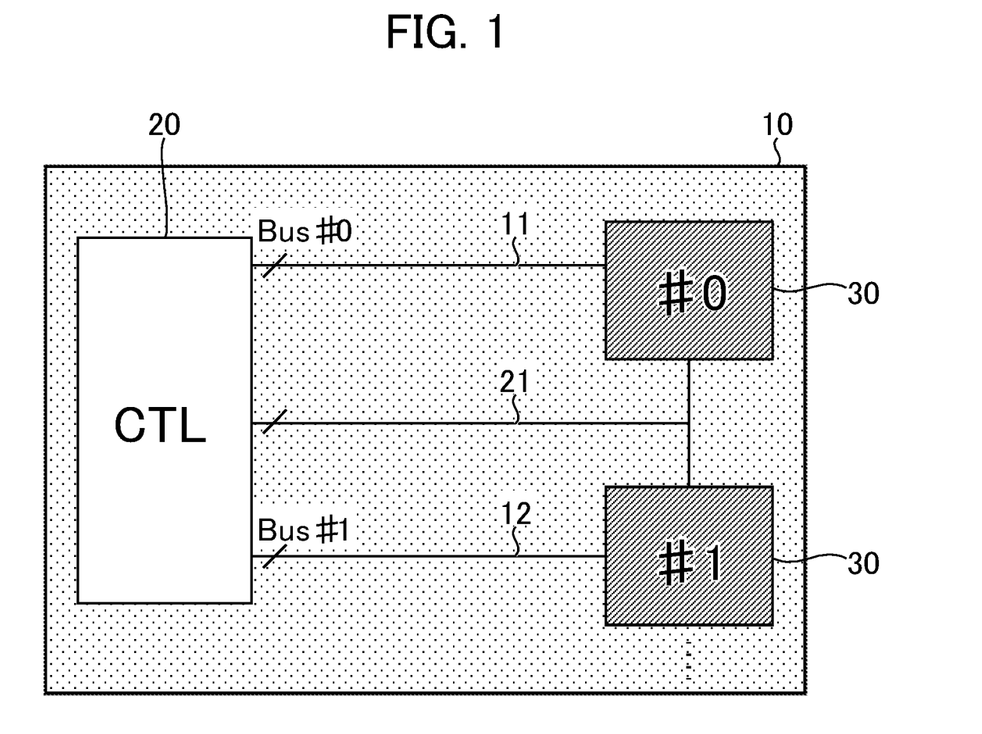
FIG. 1 is a view showing one example of the semiconductor storage apparatus embodied in the present invention.

FIG. 1 is a view showing one example of the semiconductor storage apparatus according to the present embodiment. With reference to FIG. 1, a memory controller 20 and a plurality of memory devices 30 are packaged on a substrate 10. The memory controller 20 is connected to a plurality of memory devices 30. The memory devices 30 may be memory elements or an aggregate of a plurality of memory elements.

The memory controller 20 is the one employing 'multiplex interface' that transmits command, address and data through the same bus signal lines 11 and 12.

In the memory controller 20, the command, address and data are allocated to the same bus lines 11 and 12 such that the memory controller 20 time-divisionally transmits the command signal, address and data to each of plural memory devices 30 through the same bus signal lines 11 and 12 and an identification signal to identify the command, address and data on the bus signal lines 11 and 12 is allocated to a memory common signal line 21 in common between the plurality of memory devices such that the memory controller 20 time-divisionally transmits the identification signal to the plurality of memory devices through the memory common signal line 21.

When the memory controller 20 indicates the data through the identification signal of the memory common signal line 21 so as to make the first memory device (e.g. memory device #0) transfer such data through the bus signal line 11, it makes the data transfer by the first memory device suspended and indicates the command through the identification signal so as to issue such command to the second memory device (e.g. memory device #1) and indicates the address through the identification signal so as to issue such address to the second memory device.

In this way, the number of signal lines is reduced by allocating the identification signal to identify the command, address and data on the bus signal lines 11 and 12 to the memory common signal line 21 in common between a plurality of memory devices 30 such that such identification signal is time-divisionally transmitted to the plurality of memory devices 30 through such common signal line. In addition, suspending any one of the memory devices 30 to transfer data even when such one of the memory devices 30 is on the data transfer so as to issue the command and address to another memory device 30 restrains the data transfer performance from deterioration.

In this regard, after the memory controller 20 suspends the first memory device 30 to transfer the data and indicates the command through the identification signal so as to issue such command to the second memory device 30 while indicating the address through the identification signal so as to issue such address to the second memory device 30, it makes the first memory device 30 resume the data transfer and the second memory device 30 start to transfer the data, thereby, allowing the data transfer by the first and second memory devices 30 to be concurrently performed so as to considerably restrain the performance of the data transfer from deterioration.

The memory controller 20, as one example of its internal structural arrangement, has a command/address control circuit to transmit the command and address at the desired timing; and a data transmission/receipt control circuit to transmit and receive the data at the desired timing for each of the memory devices 30, in which the memory controller 20 may be arranged such that it has an arbitration circuit to arbitrate an output timing of the identification signals among a plurality of command/address control circuits; and a select circuit that is an OR circuit to synthesize the identification signals originating from the plurality of command/address control circuits into the memory common signal line 21 both in common between the plurality of memory devices 30.

Further, the memory controller 20 may monitor the presence of command issue request to another memory device 30 while the first memory device 30 is on the data transfer. In this case, when the memory controller 20 detects such command issue request, it is preferably arranged such that it suspends the first memory device 30 to transfer the data while issuing the requested command to the memory device 30 to which the command issue is requested, thereby, allowing the memory controller 20 to monitor the command issue request of another memory device 30 while the first memory device 30 is on the data transfer and to issue the requested command upon detecting such command issue request by suspending the first memory device 30 to transfer the data, so that the memory controller 20 can effectively monitor such command issue request and is in the position of issuing the requested command timely upon detecting such command issue request.

Further, by way of one example, the identification signal includes an address latch enable signal to indicate that the address on the bus signal lines 11 and 12 is latchable; a command latch enable signal to indicate that the command on the bus signal lines 11 and 12 is latchable; and a write enable signal to indicate the timing to latch the address or the command.

Further, the plurality of memory devices 30 may be divided into plural groups each including multiple memory devices 30. In this case, the memory controller 20 is preferably arranged such that it outputs the bus signal lines 11 and 12 for each memory device 30 and the memory common signal line 21 for each group in common between multiple memory devices 30 included therein. Even when the number of memory devices 30 is so large that the load capacity applied to the memory common signal line 21 becomes so excessive that transmission speed is deteriorated when the memory common signal line 21 is connected to all the memory devices 30 in common among them, according to the present arrangement, the memory common signal line 21 is provided for each group into which the plurality of memory devices 30 is divided, so that the load capacity applied to the memory common signal line 21 is reduced. This structural arrangement exemplified herein is described later with reference to Example 2.

Moreover, the memory common signal line 21 of the memory controller 20 may be arranged such that it is connected to a plurality of memory devices through a one-to-many on and off switch circuit (not shown). In this case, the memory controller 20 is preferably arranged such that it further outputs a switch control signal to switch over the on and off switch circuit associatively with the transmission destination of the identification signal. Even when the number of memory devices 30 is so large that the load capacity applied to the memory common signal line 21 becomes so excessive that transmission speed is deteriorated when the memory common signal line 21 is connected to all the memory devices 30 in common among them, according to the present arrangement, providing the on and off switch circuit so as to connect the memory common signal line 21 of the memory controller 20 to the plurality of memory devices on one to one basis permits the load capacity applied to the memory common signal line to be reduced. This structural arrangement exemplified herein is described later with reference to Example 3.

Furthermore, each of plural memory devices 30 may have a plurality of memory elements (not shown in the drawings); and an on and off switch circuit (not shown in the drawings) to alternatively connect the bus signal lines 11 and 12 as well as the memory common signal line 21 to any one of the plurality of memory elements. In this case, the bus signal lines 11 and 12 as well as the memory common signal line 21 of the memory controller 20 are connected to the plurality of memory elements through the on and off switch circuits. Then, the memory controller further outputs a switch control signal to switch over the on and off switch circuit associatively with the memory element which data is selected as the data transfer destination. Even when the number of memory elements is so large that the load capacity applied to the memory common signal line 21 becomes so excessive that transmission speed is deteriorated when the memory common signal line 21 is connected to all the memory devices 30 in common among them, according to the present arrangement, providing a plurality of on and off switch circuits connected to the memory elements of each of the memory devices permits the load capacity applied to the memory common signal line of the memory controller to be reduced. This structural arrangement exemplified herein is described later with reference to Example 4.

Hereafter, the present invention is explained by the following concrete examples with reference to the accompanying drawings.

Example 1

Figure 2:
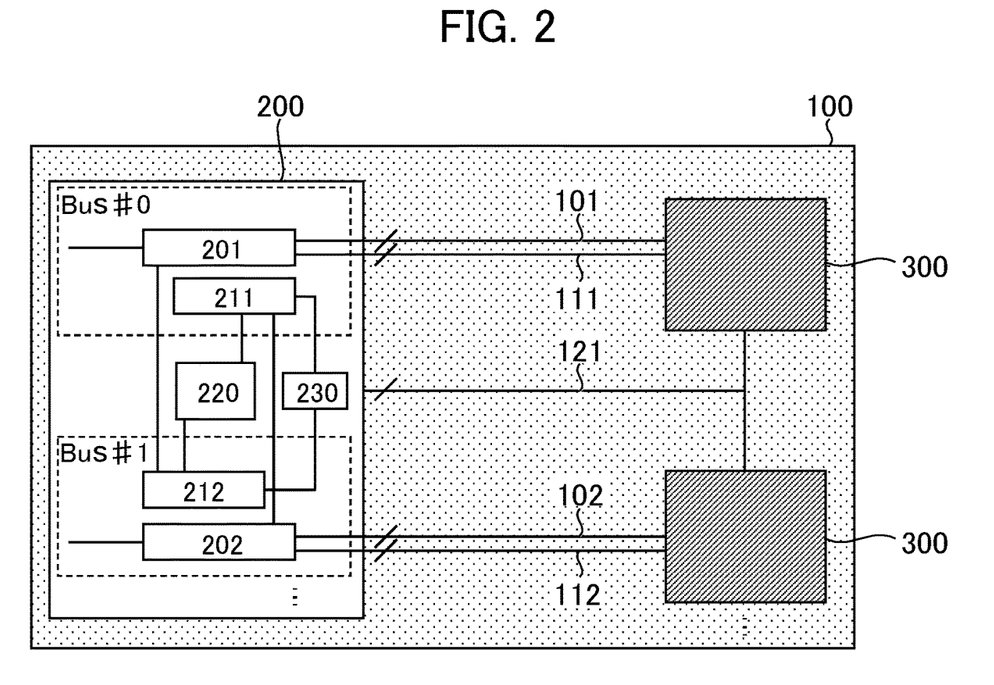
FIG. 2 is a view exemplifying the structural arrangement of the semiconductor storage apparatus according to Example 1 of the present invention.

FIG. 2 is a view exemplifying the structural arrangement of the semiconductor storage apparatus according to Example 1.

A memory controller (such semiconductor devices as chips, ASICs, LSIs and CPUs) 200 and a plurality of semiconductor memory elements 300 are packaged on a substrate 100.

The semiconductor storage apparatus according to the present example adopts 'multiplex interface' for the transmission system among the memory controller and the memory elements. The 'multiplex interface' is an interface that transmits an address/command signal and a data signal through the same signal line. There is a merit in this transmission system that it does not require the provision of any exclusive pin for the address/command signal, so that the number of signals can be reduced. However, the address/command signal and the data signal are transmitted through the same signal line so that control signals (identification signals 121) to identify signals flowing through such signal line is required. For example, if the semiconductor memory element 300 is a NAND flash memory, the identification signals 121 include an Address Latch Enable signal or ALE, a Command Latch Enable signal or CLE and a Write Enable signal or WE #.

There are data signals 101 and 102 of the memory buses correspondingly to the plurality of semiconductor memory elements 300 respectively. Such identification signals 121 as ALE, CLE and WE # signals are shared among the plurality of semiconductor memory elements 300.

In the memory controller 200, an arbitration circuit (arbiter) 220 is provided to integrate the identification signals to control the data buses of the data signals 101 and 102 respectively into the identification signals 121 shared among the plurality of data buses, in which the identification signals 121 are generated in such a manner that the arbitration circuit 220 controls the OR circuit (or selector circuit) 230. The arbitration circuit 220 controls the OR circuit 230 such that the latter selects the identification signals for the semiconductor memory element 300 to which such identification signals should be outputted.

According to the present example, the number of pins of the memory controller 200 and the number of signal lines on the substrate 100 are reduced with the identification signals 121 shared among the plurality of semiconductor memory elements 300. However, as regards buses connected to the semiconductor memory elements 300, simply sharing the identification signals 121 in the arrangement that there exists a bus for each semiconductor memory element 300 (corresponding to the arrangement with two buses or Bus #0 and Bus #1 exemplified in FIG. 2), the throughput performance corresponding to only one bus is achieved in spite of the fact that there are physically two buses. This deteriorated performance is caused by the sharing of signal lines.

Thus, according to the present example, in addition to the identification signals 121 shared among the plurality of buses, the command issue control circuits 211 and 212 are added to the memory controller 200 such that the address/command issue of the Bus #1 is feasible even when the Bus #0 is on the data transfer. The above arrangement permits the throughput performance corresponding to two buses to be maintained.

Figure 3:
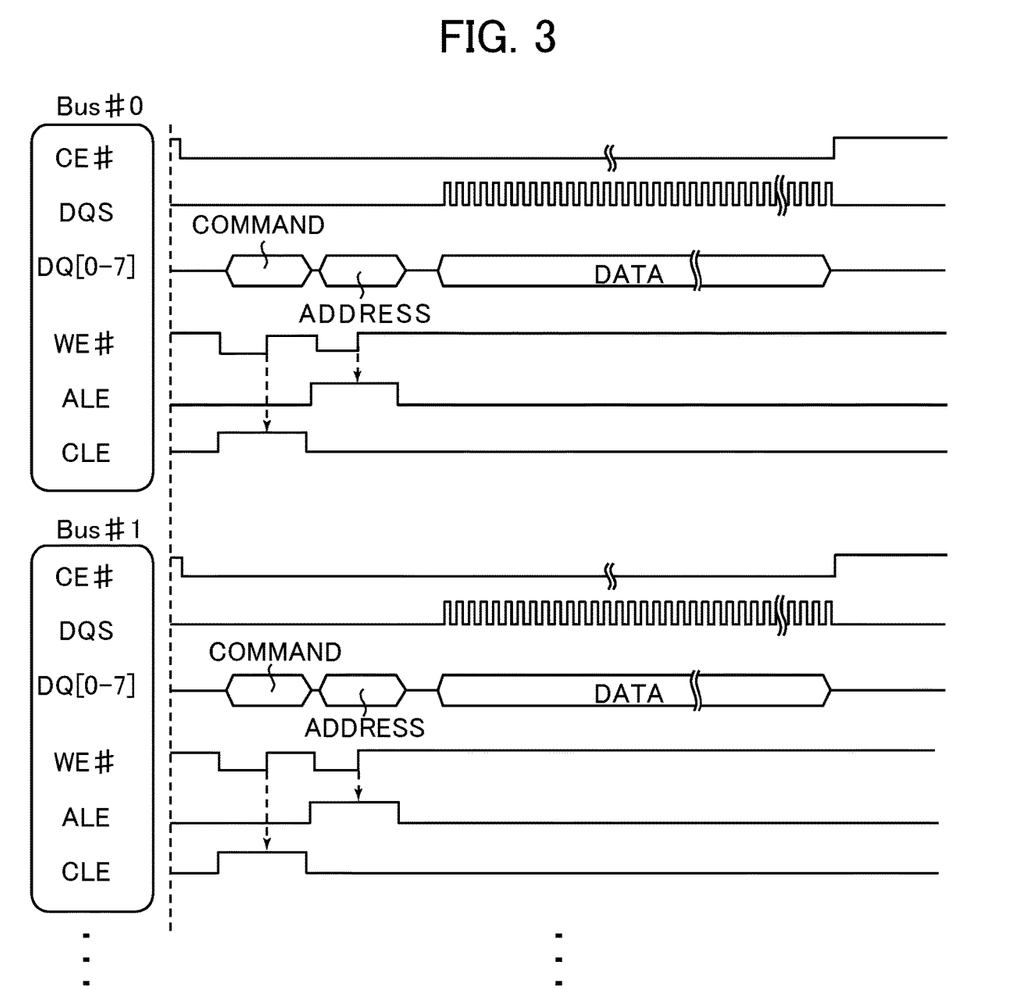
FIG. 3 is a timing chart exemplifying the operation of the memory controller upon writing when identification signals are provided to each bus for the purpose of comparison with Example 1.
Figure 4:
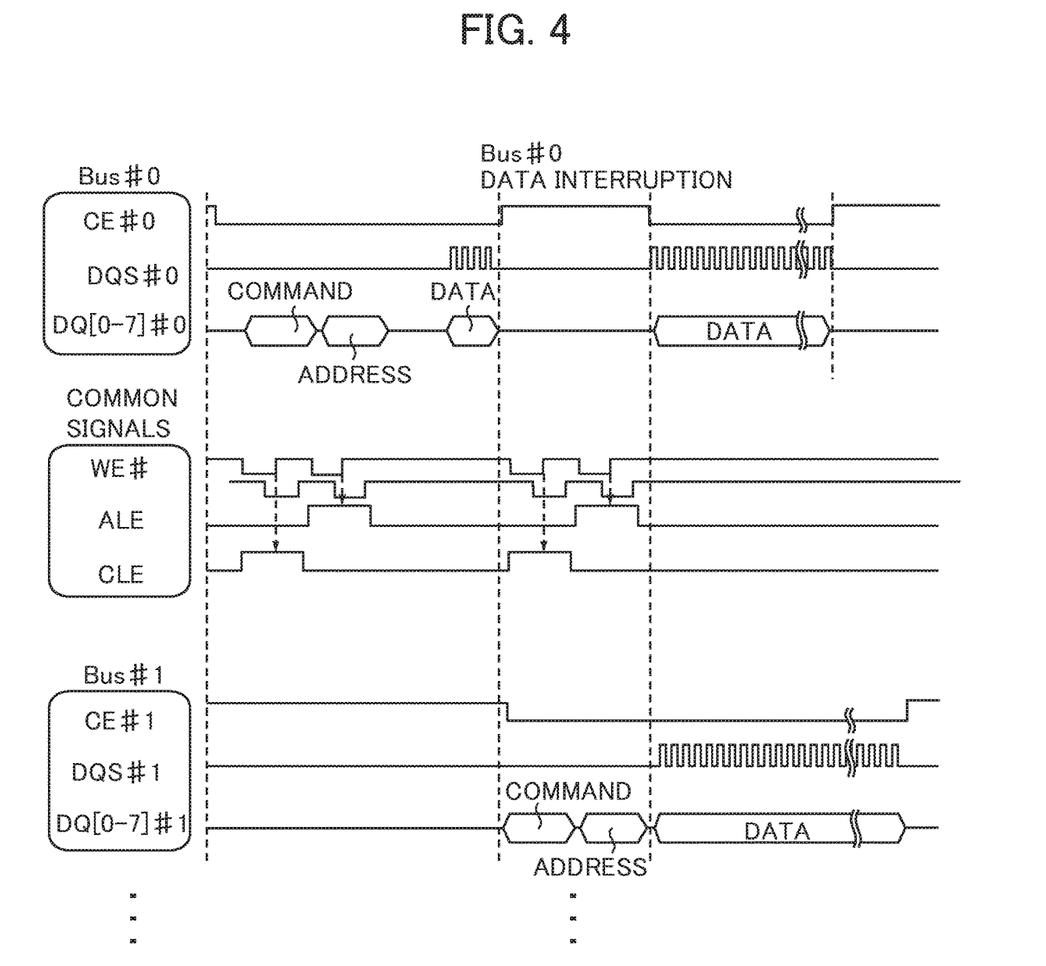
FIG. 4 is a timing chart exemplifying the operation of the memory controller upon writing according to Example 1.

FIG. 3 is a timing chart exemplifying the operation of the memory controller upon writing when the identification signals are provided to each bus for comparison with Example 1. FIG. 4 is a timing chart exemplifying the operation of the memory controller upon writing according to Example 1.

FIGS. 3 and 4 both illustrate the case where the semiconductor memory element 300 corresponds to a NAND flash memory element. However, the semiconductor memory element 300 is not limited to a NAND flash memory and may be any of such various memory elements as ReRAM (Resistance Random Access Memory), MRAM (Magneto resistive RAM), and PCM (Phase Change Memory).

When the identification signals are provided separately for each bus as illustrated in FIG. 3, all the signals are respectively and independently connected to each semiconductor memory element 300. According to the example illustrated in FIG. 3, respectively independent signals or a chip selection signal or CE #, a data signal or DQ, a strobe signal or DQS, an address latch enable signal or ALE, a command latch enable signal CLE and a write enable signal or WE # are connected to the respective Bus #0 and Bus #1. Thus, those Bus #0 and Bus #1 can transfer data irrespectively of the state of the other bus and independently from each other. In other words, according to the arrangement illustrated in FIG. 3, it is capable of transferring data twice as much as the data transfer by one bus.

According to the present example, such identification signals 121 as the ALE, CLE and WE # signals are shared between Bus #0 and Bus #1, so that the memory controller 200 can operate only either of the Bus #0 and Bus #1 upon issuing the address/command signal as illustrated in FIG. 4. On the other hand, during the data transfer, the identification signals 121 shared between the Bus #0 and Bus #1 are latched, so that it is feasible to simultaneously perform the data transfers of the Bus #0 and Bus #1. Thus, according to the present example, by placing a priority on the address/command signal issue over the data transfer, when the data transfer request arises, it makes such requested data transfer start as quickly as possible.

As illustrated in FIG. 4, for instance, when the request for issuing the address/command signal (hereinafter, referred to as 'address/command issue request') of the Bus #1 arises during the data transfer of the Bus #0, the memory controller 200 switches over the chip selection signal or CE signal 111 (CE #0) of the Bus #0 to non-selection so as to halt the data signals 101 (data signal or DQ signal and strobe signal or DQS signal), thereby, the data transfer of the Bus #0 is suspended.

When the data transfer of the Bus #0 is suspended, the identification signals 121 are available for use, so that the memory controller 200 can issue the address/command signal of the Bus #1. The memory controller 200 starts the data transfer of the Bus #1 subsequently after issuing the address/command signal of the Bus #1. Since the data transfer of the Bus #0 having been suspended becomes feasible after the data transfer of the Bus #1 is started, the memory controller 200 resumes the data transfer of the Bus #0. This is because it is feasible to simultaneously perform the data transfers of the Bus #0 and Bus #1 on the ground that during the data transfer the identification signals 121 shared between the Bus #0 and Bus #1 are latched.

Figure 5:
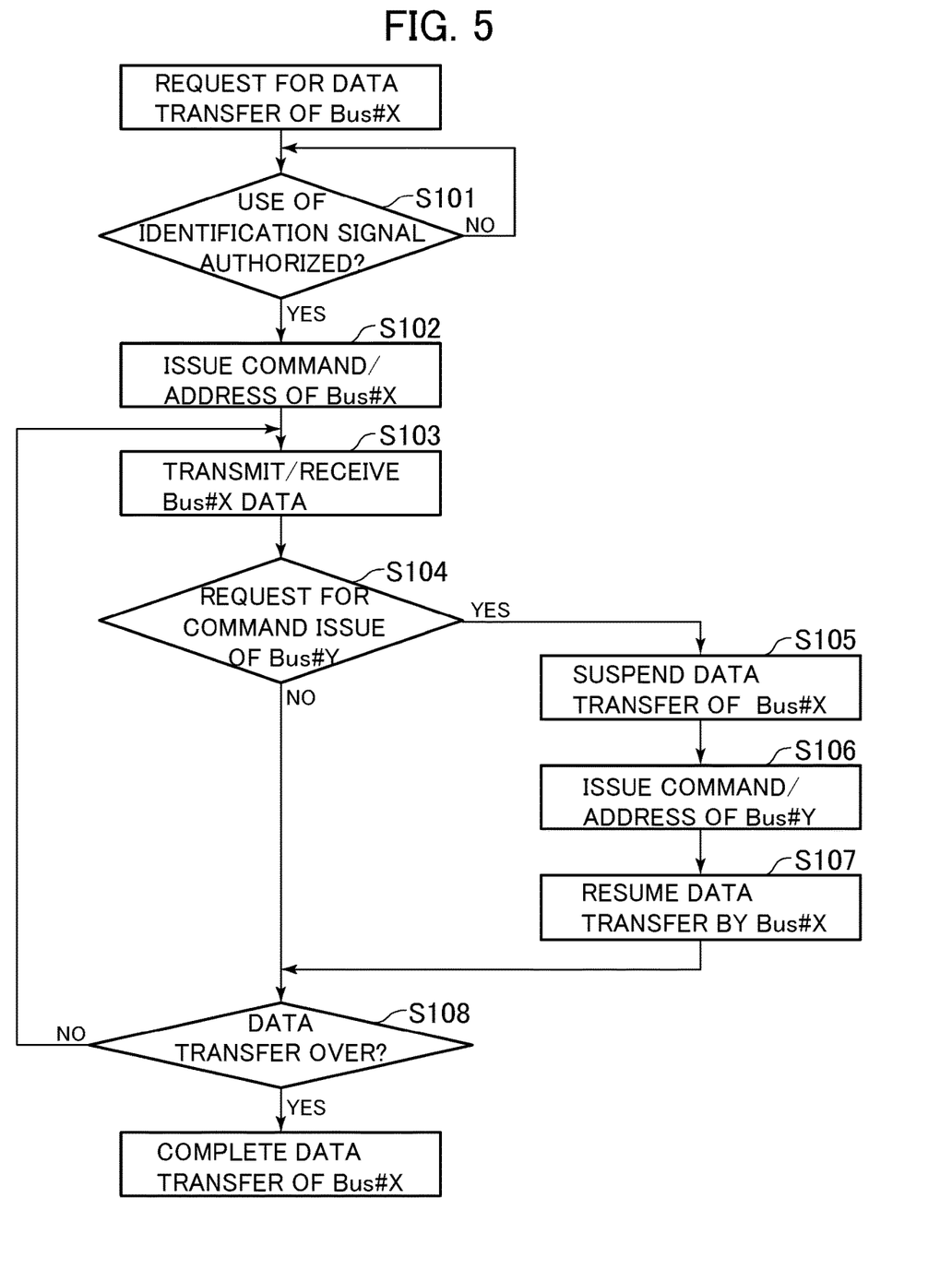
FIG. 5 is a flow chart exemplifying the bus control of the semiconductor storage apparatus according to Example 1.

FIG. 5 is a flow chart exemplifying the bus control of the semiconductor storage apparatus according to Example 1.

When the data transfer of any one of buses (Bus # x) is performed, the memory controller 200 firstly secures the identification signals shared between the plurality of buses for the Bus # x (at Step S101) and issues the address/command signal (at Step S102). Thereafter, the memory controller 200 starts the data transfer of the Bus # x (at Step S103).

During the data transfer, the memory controller 200 continuously checks to the end of the data transfer whether or not the address/command issue request of another bus arises (at Step S104).

If the address/command issue request of another bus (Bus # y) arises during the data transfer of the Bus # x (Yes at Step S104), the memory controller 200 suspends the data transfer of the Bus # x (at Step S105) so as to issue the address/command signal (at Step S106).

Thereafter, the memory controller 200 resumes the data transfer of the Bus # x in suspension (at Step S107) and determines whether or not the data transfer is over (at Step S108).

Unless the address/command issue request of the Bus # y arises during the data transfer (No at Step S104), the memory controller 200 determines whether or not the data transfer of the Bus # x is over (at Step S108).

Unless the data transfer is over (No at Step S108), the memory controller 200 returns to the step S103. If the data transfer is over (Yes at Step S108), the memory controller 200 ends the operation.

Figure 6:
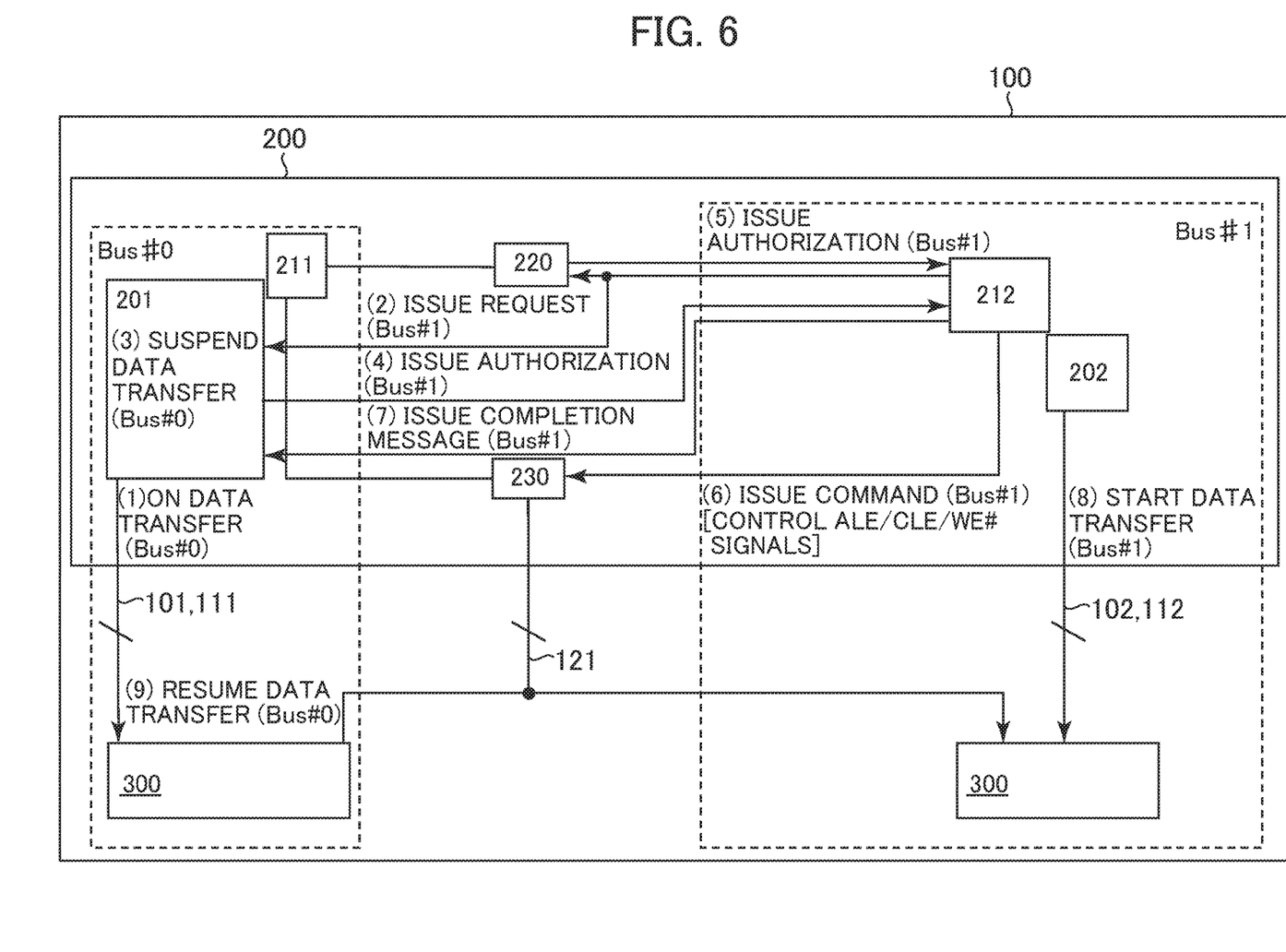
FIG. 6 is a view to explain the internal operation of the memory controller 200 according to Example 1.

FIG. 6 is a view to explain the internal operation of the memory controller 200 according to Example 1. In FIG. 6, the arrangement with two buses including Bus #0 and Bus #1 sharing the identification signals 121 between them is exemplified.

The operation of the memory controller 200 taken when the data transfer request of another bus (for instance, Bus #1 herein) arises during the data transfer of one of the buses (for instance, Bus #0 herein) is explained as follows.

(1) During the data transfer of the Bus #0 by the data transmission control circuit 201 of the Bus #0, (2) the command issue control circuit 212 of the Bus #1 issues the address/command issue request of the Bus #1 to the arbitration circuit 220 and the data transmission control circuit 201 of the Bus #0.

Upon receiving the address/command issue request, (3) the data transmission control circuit 201 of the Bus #0 halts the chip selection signal 111 and the data signal 101 to suspend the data transfer. The chip selection signal 111 mentioned herein includes the chip select signal or CS signal and the chip enable signal or CE # signal and the like. The data signal 101 halted herein also includes the strobe signals (DQS and DQS #).

Thereafter, (4) the data transmission control circuit 201 of the Bus #0 transmits the authorization to issue the address/command signal (hereinafter, referred to as 'address/command issue authorization') to the command issue control circuit 212 of the Bus #1 while (5) the arbitration circuit 220 of the Bus #0 transmits an issue authorization signal to the command issue control circuit 212 of the Bus #1.

The command issue control circuit 212 of the Bus #1 that receives the address/command issue authorization signal of (4) from the data transmission control circuit 201 and the issue authorization signal of (5) from the arbitration circuit 220 (6) issues the address/command signal.

Thereafter, (7) the command issue control circuit 212 of the Bus #1 transmits a message to the effect that the address/command signal issue is completed to the data transmission control circuit 201 of the Bus #0. Further, (8) the data transmission control circuit 202 of the Bus #1 starts the data transfer of the Bus #1.

In turn, the data transmission control circuit 201 of the Bus #0 having received the message to the effect that the address/command signal issue is completed (9) resumes the data transfer.

Owing to the operational steps illustrated in FIG. 6, the suspension of the data transfer temporarily arises for a short time, but the simultaneous data transfer of two buses is feasible after such short suspension.

Hereafter, the suspended duration of the data transfer is calculated. Herein, the case where data is written to a NAND flash memory is exemplified.

Where data is written to a NAND flash memory, the time required for issuing the address/command signal is 120 ns. On the other hand, the time required for transferring data is 80 μs and the busy duration is 2500 μs. Therefore, the time increase arisen by suspending the data transfer to issue the address/command signal is 0.005% or smaller, meaning reduced deterioration of the performance, and performance corresponding to substantially two buses is maintained. Accordingly, the present example permits the number of pins of the memory controller 200 and the number of wires on the substrate 100 to be reduced while maintaining the overall performance of the plurality of buses.

To note, according to the present example, the above explanation is mainly given by exemplifying the memory controller employing the 'multiplex interface' to control NAND flash memories, to which the present invention is not limited. The technique disclosed in the present example is widely applicable to a memory controller and its signal transmission system to control a plurality of memory buses employing an interface transmitting the address/command signal and the data signal through the same signal line and having signals to identify the address, command and data.

Example 2

Figure 7:
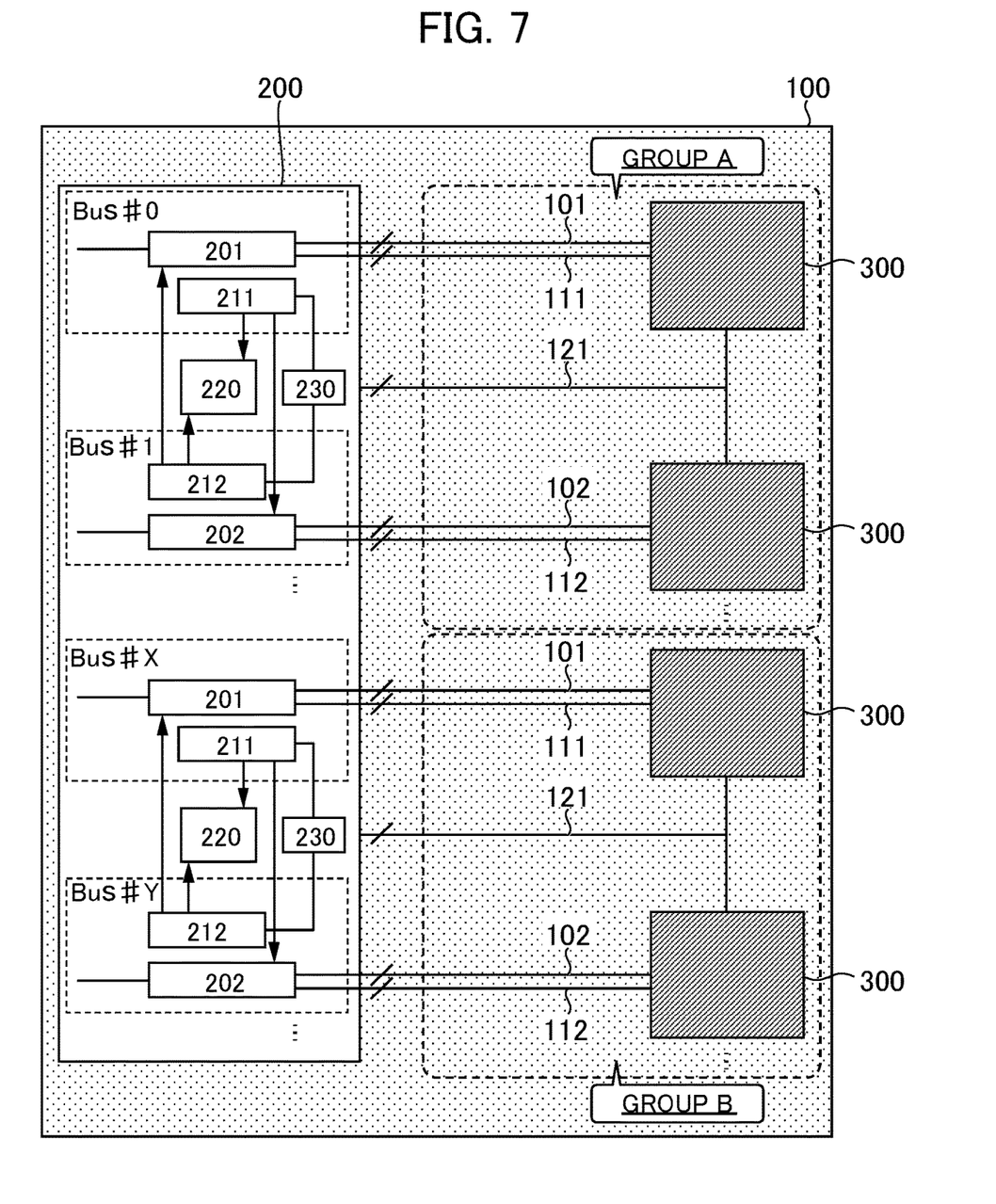
FIG. 7 is a view exemplifying the structural arrangement of the semiconductor storage apparatus according to Example 2.

FIG. 7 is a view exemplifying the structural arrangement of the semiconductor storage apparatus according to Example 2.

According to Example 2, the memory controller 200 controls a larger number of semiconductor memory elements 300 than the one of Example 1. Example 2 is the same as Example 1 in that a plurality of buses share the same identification signals among the memory controller 200 and the semiconductor memory elements 300.

However, when one identification signal is shared among all the semiconductor memory elements 300, the load capacity applied to the signal line of such identification signal increases so that the waveform of such identification signal becomes obtuse so as to lead to deterioration of the transmission speed. Thus, according to the Example 2, it is arranged such that the plurality of semiconductor memory elements 300 are divided into a plurality of groups and the semiconductor memory elements 300 belonging to the same group share the identification signal among them. The number of semiconductor memory elements 300 belonging to each group is such a number that the load capacity is controlled within the allowable range even when the semiconductor memory elements 300 belonging to each group share one identification signal. According to the example in FIG. 7, two semiconductor memory elements 300 belong to one group, thereby, preventing the transmission speed from deterioration, which is caused by the increased load capacity of the identification signal while permitting the number of pins of the memory controller to be reduced through the sharing of the identification signal.

With reference to FIG. 7, the semiconductor memory elements 300 are divided into groups A, B and so on. The memory controller 200 according to Example 2 is arranged such that it incorporates a plurality of the internal circuits of the counterpart according to Example 2 illustrated in FIG. 2. The internal circuit includes the data transmission control circuits 201 and 202, the command issue control circuits 211 and 212, the arbitration circuit 220 and the selector circuit 230. The number of the internal circuits of the memory controller according to Example 1 is the same as number of the groups, in which the respective internal circuits of the memory controller correspond to each group.

The operation of the data transmission control circuits 201 and 202, the command issue control circuits 211 and 212, the arbitration circuit 220 and the selector circuit 230 respectively is the same as that of Example 1.

As explained above, according to Example 2, in the signal transmission system in which data transfer is performed among the memory controller 200 and the plurality of semiconductor memory elements 300, unlike Example 1, the plurality of semiconductor memory elements 300 are divided into groups and the semiconductor memory elements 300 belonging to the same group share the same identification signal, thereby, allowing the load capacity applied to the signal line of the identification signal to be controlled within the allowable range so as to restrain the signal transmission speed from deteriorating while reducing the number of pins of the memory controller 200.

Example 3

Figure 8:
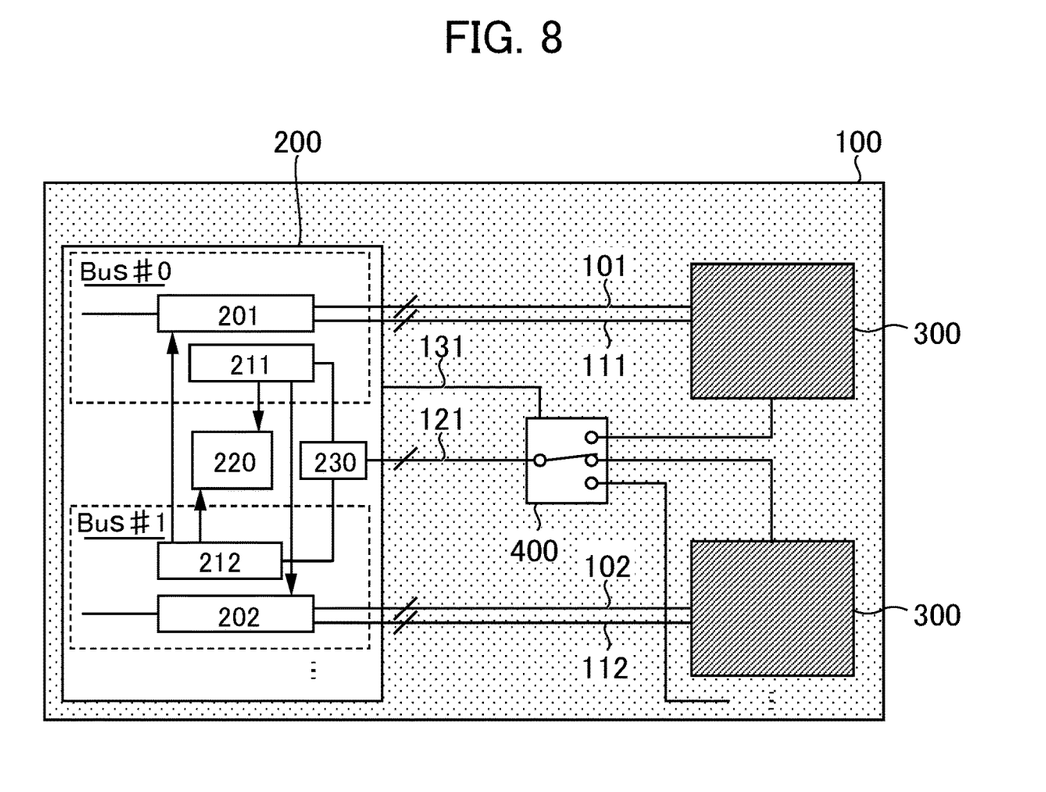
FIG. 8 is a view exemplifying the structural arrangement of the semiconductor storage apparatus according to Example 3.

FIG. 8 is a view exemplifying the structural arrangement of the semiconductor storage apparatus according to Example 3.

According to Example 3, like Example 2, the memory controller 200 controls a larger number of semiconductor memory elements 300 than the one according to Example 1. Further, Example 3 is the same as Example 1 in that the plurality of buses shares the same identification signals among the memory controller 200 and the semiconductor memory elements 300.

When one identification signal is shared among all the semiconductor memory elements 300, the load capacity applied to the signal line of such identification signal increases so that the waveform of such identification signal becomes obtuse so as to lead to deteriorating the transmission speed. Thus, according to Example 3, the switch circuit 400 is provided between the memory controller 200 and the semiconductor memory elements 300, and the semiconductor memory element 300 to which the identification signal 121 from the memory controller 200 is connected is switched over with the switch circuit 400. Thus, it is not necessary to connect the plurality of semiconductor memory elements 300 to the signal line of the identification signal, so that the deterioration of the transmission speed caused by the load capacity applied to the signal line of the identification signal can be controlled.

With reference to FIG. 8, the memory controller 200, the plurality of semiconductor memory elements 300 and the switch circuit 400 are packaged on the substrate 100. The switch circuit 400 is a one-to-many on and off select circuit through a control signal 131. The switch circuit 400 includes a bus switch circuit, an analog switch circuit and a digital switch circuit, for example. The identification signal 121 from the memory controller 200 is connected to a terminal on the side of the switch circuit 400 where there is one terminal. Plural terminals on the side where there are plural terminals 400 are respectively connected to the plural corresponding semiconductor memory elements 300.

This arrangement allows the number of pins of the memory controller 200 to reduce with the identification signal 121 shared among the plurality of semiconductor memory elements 300 and prevents the transmission speed from deterioration, which is caused by the load capacity applied to the signal line of the identification signal 121.

With reference to FIG. 8, the memory controller 200 according to Example 3 has the same arrangement as the counterpart 200 according to Example 1 illustrated in FIG. 2. According to Example 3, however, the arbitration circuit 220 controls the OR circuit 230 in the same way as the one according to Example 1 and generates the control signal 131 to switch over the connection destination of the identification signal 121 outputted by the OR circuit 230 associatively with controlling the OR circuit.

Example 4

Figure 9:
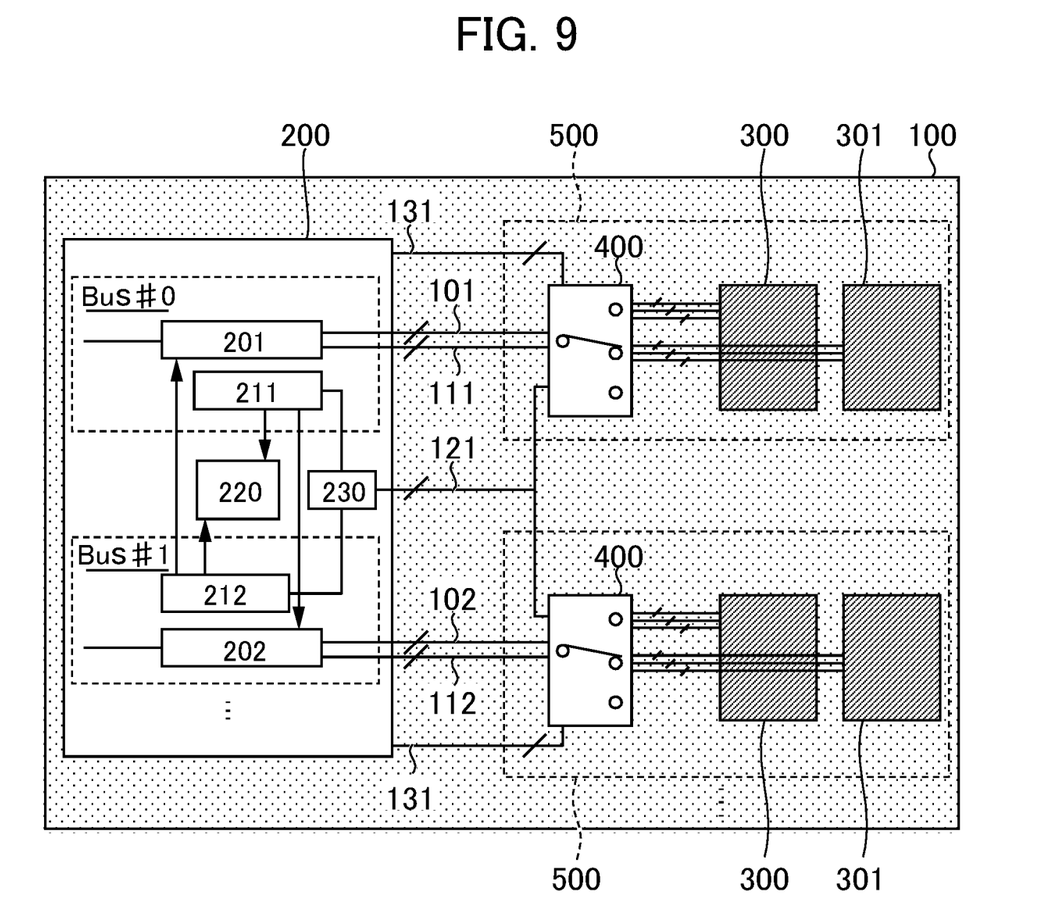
FIG. 9 is a view exemplifying the structural arrangement of the semiconductor storage apparatus according to Example 4.

FIG. 9 is a view exemplifying the structural arrangement of the semiconductor storage apparatus according to Example 4.

Like Examples 2 and 3, the memory controller 200 according to Example 4 controls a larger number of semiconductor memory elements 300 than the one of Example 1. Further, Example 4 is the same as Example 1 in that a plurality of buses shares the same identification signal among the memory controller 200 and the semiconductor memory elements 300.

However, when one identification signal is shared among all the semiconductor memory elements 300, the load capacity applied to the signal line of such identification signal increases so that the waveform of such identification signal becomes obtuse so as to lead to deteriorating the transmission speed. Thus, according to Example 4, memory devices 500 are provided instead of the semiconductor memory elements 300 illustrated in FIG. 2. The memory device 500 includes a plurality of semiconductor memory elements 300, 301 and so on as well as the switch circuit 400.

The memory devices 500 of the Buses #0 and #1 have the same arrangement, but at the Bus #0, for example, the switch circuit 400 alternatively connects the data signal 101, chip selection signal 111 and identification signal 121 from the memory controller 200 to any one of the semiconductor memory elements 300, 301. The control signal 131 to control the one and off selective switching of the switch circuit 400 is provided by the memory controller 200.

The operations of the data transmission control circuits 201 and 202, the command issue control circuits 211 and 212, the arbitration circuit 220 and the selector circuit 230 incorporated in the memory controller 200 according to Example 4 are the same as those of the counterparts according to Example 1.

However, the command issue control circuits 211 and 212 control the issue of the command signal to the plurality of semiconductor memory elements 300, 301 incorporated in the corresponding memory devices 500. Thereat, the command issue control circuits 211 and 212 generate the control signal 131 to control the on and off selective switching of the switch circuit 400 associatively with the semiconductor memory elements 300, 301 which are selected as the data transfer destinations among the plurality of semiconductor memory elements 300, 301.

The above arrangement according to Example 4 allows the number of semiconductor memory elements to be connected to the signal line of the identification signal to be controlled such that the load capacity applied to the signal line of the identification signal is controlled within the allowable range so as to permit the number of pins of the memory controller 200 to reduce and to restrain the transmission speed from deterioration, which is caused by the load capacity applied to the signal line of the identification signal.

With reference to FIG. 9, the memory controller 200, a plurality of semiconductor memory elements 300, 301 and a plurality of switch circuits 400 are packaged on the substrate 100. The memory devices 500 are respectively constituted by one switch circuit 400 and the plurality of semiconductor memory elements 300, 301. The memory controller 200 is provided with a memory bus correspondingly to the memory devices 500 respectively. The memory controller 200 decides the connection destination of the identification signal 121 to any one of the semiconductor memory elements 300, 301 through the control signal 131.

The reason the switch circuit 400 is employed according to Example 4 is to enable multi-staged memory elements 300, 301 to be connected to the sole memory bus. If it were not for the switch circuit 400, it would be necessary that the plurality of semiconductor memory elements 300, 301 are connected to the sole signal line, so that the load capacity applied to the signal line becomes so excessive that high-speed data transfer is infeasible or the throughput (throughput performance) might deteriorate.

According to Example 4, the plurality of buses share the identification signal 121 to identify the address/command signal and data signal among the signal lines connected to the semiconductor memory elements through the switch circuit 400. In other words, the plurality of switch circuits 400 share the identification signal. Thereby, even in the signal transmission system to connect the multi-staged plural semiconductor memory elements 300, 301 to the memory buses employing the switch circuits 400, the identification signals 121 can be reduced through the sharing of such signal lines and the number of pins of the memory controller 200 can be reduced.

The present invention is explained above with various embodiments and examples with reference to the accompanying drawings, but they are given only for the sake of explanation. The scope of the present invention is not limited to those embodiments and examples. The persons skilled in the art would carry out the present invention in various manners without departing from the scope and spirit of the present invention.

LIST OF REFERENCE OF SIGNS

10 substrate
100 substrate
101 data signal
102 data signal
11 bus signal line
111 chip selection signal
112 chip selection signal
121 identification signal
131 control signal
2 bus
20 memory controller
200 memory controller
201 data transmission control circuit
202 data transmission control circuit
21 memory common signal line
211 command issue control circuit
212 command issue control circuit
220 arbitration circuit
230 OR circuit (selector circuit)
30 memory device
300 semiconductor memory element
400 switch circuit
500 memory device

The invention claimed is:

1. A memory controller to control a plurality of memory devices, wherein command, address and data are allocated to transmit the command, the address and the data to each of the plurality of memory devices through a same bus signal line and an identification signal to identify the command, the address and the data on the bus signal line is allocated to a memory common signal line that is separate from the bus signal line and common among the plurality of memory devices to transmit the identification signal; when the memory controller indicates the data through the identification signal so as to make a first memory device transfer the data through the bus signal line, the memory controller suspends the data transfer by the first memory device, indicates the command through the identification signal so as to issue the command to a second memory device, and indicates the address through the identification signal so as to issue the address to the second memory device.

2. The memory controller according to claim 1, wherein subsequently after the memory controller makes the data transfer by the first memory device suspended, indicates the command through the identification signal so as to issue the command to the second memory device, and indicates the address through the identification signal so as to issue the address to the second memory device, memory controller makes the data transfer by the first memory device resume while making the second memory device start the data transfer.

3. The memory controller according to claim 1,
wherein the memory controller has a command/address control circuit to transmit the command and address at a desired timing and a data transmission/receipt control circuit to transmit/receive the data at a desired timing for each of the memory devices; and
wherein the memory controller has an arbitration circuit to arbitrate an output timing of the identification signal among the plurality of command/address control circuits and a selector circuit that is an OR circuit to synthesize the identification signal from the plurality of command/address control circuits into the memory common signal line in common among the plurality of memory devices.

4. The memory controller according to claim 1, wherein the memory controller monitors presence of a command issue request to another memory device while the first memory device is on the data transfer and makes the data transfer by the first memory device suspended upon detecting the command issue request so as to issue the command to the other memory device for which the command issue request is made.

5. The memory controller according to claim 1, wherein the identification signal includes an address latch enable signal indicating that the address on the bus signal line is latchable, a command latch enable signal indicating the command on the bus signal line is latchable, and a write enable signal indicating a timing by which the address or the command is latched.

6. The memory controller according to claim 1,
wherein the plurality of memory devices may be divided into a plurality of groups each including multiple memory devices; and the memory controller outputs the bus signal line for each of the memory devices and the memory common signal line for the respective groups in common between the multiple memory devices included in the respective groups.

7. The memory controller according to claim 1,
wherein the memory common signal line of the memory controller is connected through a one-to-many on and off switch circuit to the plurality of memory devices; and
the memory controller further outputs a switch control signal to switch over the one and off switch circuit associatively with a transmission destination of the identification signal.

8. The memory controller according to claim 1,
wherein each of the plurality of memory devices has a plurality of memory elements and an on and off switch circuit to alternatively connect the bus signal line as well as the memory common signal line to any one of the plurality of memory elements;
the bus signal line as well as the memory common signal line of the memory controller are connected to the plurality of memory elements through the on and off switch circuit; and
the memory controller further outputs a switch control signal to switch over the on and off switch circuit associatively with the memory element which is selected as a data transfer destination.

9. A memory control method by a memory controller to control a plurality of memory devices, the method comprising:
allocating command, address and data to transmit the command, the address and the data to each of the plurality of memory devices through a same bus signal line and allocating an identification signal to identify the command, the address and the data on the bus signal line to a memory common signal line that is separate from the bus signal line and in common among the plurality of memory devices to transmit the identification signal;
when the data is indicated through the identification signal so as to make a first memory device transfer the data through the bus signal line, suspending the data transfer by the first memory device;
indicating the command through the identification signal so as to issue the command to a second memory device; and
indicating the address through the identification signal so as to issue the address to the second memory device.

10. A semiconductor storage apparatus comprising:
a plurality of memory devices; and
a memory controller to control the plurality of memory devices,
wherein in the memory controller, command, address and data are allocated to transmit the command, the address and the data to each of the plurality of memory devices through a same bus signal line and an identification signal to identify the command, the address and the data on the bus signal line is allocated to a memory common signal line that is separate from the bus signal line and in common among the plurality of memory devices to transmit the identification signal; when the memory controller indicates the data through the identification signal so as to make a first memory device transfer the data through the bus signal line, the memory controller suspends the data transfer by the first memory device, indicates the command through the identification signal so as to issue the command to a second memory device, and indicates the address through the identification signal so as to issue the address to the second memory device.

* * * * *